United States Patent
Odell et al.

(10) Patent No.: US 7,293,868 B2
(45) Date of Patent: Nov. 13, 2007

(54) CURABLE PHASE CHANGE INK COMPOSITION

(75) Inventors: Peter Gordon Odell, Mississauga (CA); Marcel P. Breton, Mississauga (CA); Christy E. Bedford, Burlington (CA); Christopher A. Wagner, Toronto (CA)

(73) Assignee: Xerox Corporation, Stamford, CT (US)

( * ) Notice: Subject to any disclaimer, the term of this patent is extended or adjusted under 35 U.S.C. 154(b) by 388 days.

(21) Appl. No.: 11/018,378

(22) Filed: Dec. 22, 2004

(65) Prior Publication Data

US 2006/0132570 A1    Jun. 22, 2006

(51) Int. Cl.
*G01D 11/00* (2006.01)

(52) U.S. Cl. .................. 347/100; 347/95; 523/160

(58) Field of Classification Search .......... 347/100, 347/101, 102, 95, 96; 106/31.6, 31.27, 31.13; 523/160
See application file for complete search history.

(56) References Cited

U.S. PATENT DOCUMENTS

| | | |
|---|---|---|
| 3,653,932 A | 4/1972 | Berry et al. |
| 4,390,369 A | 6/1983 | Merritt et al. |
| 4,484,948 A | 11/1984 | Merritt et al. |
| 4,490,731 A | 12/1984 | Vaught |
| 4,684,956 A | 8/1987 | Ball |
| 4,851,045 A | 7/1989 | Taniguchi |
| 4,889,560 A | 12/1989 | Jaeger et al. |
| 5,006,170 A | 4/1991 | Schwarz et al. |
| 5,151,120 A | 9/1992 | You et al. |
| 5,372,852 A | 12/1994 | Titterington et al. |
| 5,476,540 A | 12/1995 | Shields et al. |
| 5,496,879 A | 3/1996 | Griebel et al. |
| 5,531,817 A | 7/1996 | Shields et al. |
| 5,554,212 A | 9/1996 | Bui et al. |
| 6,106,599 A * | 8/2000 | Breton et al. ............. 106/31.29 |
| 2004/0132862 A1 | 7/2004 | Woudenberg |

FOREIGN PATENT DOCUMENTS

| | | |
|---|---|---|
| DE | 42 05 636 A1 | 8/1993 |
| DE | 42 05 713 A1 | 8/1993 |
| EP | 0 187 352 A2 | 7/1986 |
| EP | 0 206 286 A1 | 12/1986 |
| WO | WO 94/04619 | 3/1994 |

\* cited by examiner

*Primary Examiner*—Manish S. Shah
(74) *Attorney, Agent, or Firm*—Oliff & Berridge, PLC

(57) ABSTRACT

Ink compositions that includes one or more radiation curable oil soluble components and one or more thermal solvents are provided, as well as methods of preparing such ink compositions and methods of using such ink compositions are provided.

17 Claims, 5 Drawing Sheets

CURABLE PHASE CHANGE INK COMPOSITION

BACKGROUND

Ink jet printing processes that employ inks that are solid at room temperature and liquid at elevated temperatures are known. For example, U.S. Pat. No. 4,490,731, the disclosure of which is incorporated herein by reference in its entirety, discloses an apparatus for dispensing solid inks for printing on a substrate such as paper. The ink vehicle is chosen to have a melting point above room temperature so that the ink, which is melted in the apparatus, will not be subject to evaporation or spillage during periods of nonprinting. The vehicle selected possesses a low critical temperature to permit the use of the solid ink in a thermal ink jet printer. In thermal, or hot-melt, ink jet printing processes employing these phase change inks, the solid ink is melted by a heater in the printing apparatus and used as a liquid in a manner similar to that of conventional piezoelectric or thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. After the phase change ink is applied to the substrate, freezing on the substrate resolidifies the ink.

In general, phase change or "hot melt" ink compositions are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are incorporated herein by reference in their entirety. Phase change inks have also been used for applications such as postal marking and industrial marking and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

U.S. Pat. Nos. 5,531,817 and 5,476,540, the disclosures of which are incorporated herein by reference in their entirety, disclose the control of color bleed (the invasion of one color into another on the surface of the print medium) using ink-jet inks by employing either high molecular weight polymers that exhibit a reversible gelling nature with heat or certain amine oxide surfactants that undergo sol-gel transitions.

U.S. Pat. No. 5,554,212, the disclosure of which is incorporated herein by reference in its entirety, discloses an aqueous phase change ink composition that contains a water dispersible sulfonated polyester gloss agent and a hyperthermogelling component that causes gellation at temperatures at or above its thermo-inversion point or at high concentrations.

While hot melt ink compositions are used successfully, a need remains for phase change ink compositions that are suitable for hot melt ink jet printing processes, such as piezoelectric ink jet printing processes and the like. There is still a need for ink compositions that can be processed at lower temperatures and with lower energy consumption, and a need for inks that have improved robustness and printing latitude. There is also a need for ink compositions that have improved jetting reliability and latitude with respect to meeting both the jetting and transfuse requirements of curable aqueous and non-aqueous inks. In addition, a need remains for phase change ink compositions that exhibit desirably low viscosity values at jetting temperatures. Additionally, a need remains for phase change ink compositions that generate images with improved look and feel characteristics. Additionally, there is a need for phase change ink compositions that generate images with improved hardness and toughness characteristics. A need also remains for phase change ink compositions that are suitable for high speed printing, thereby enabling transaction and production printing applications. In addition, there remains a need for curable ink compositions for piezoelectric ink jet printing that produce a stable image that can be transferred to a substrate without cracking and hardened upon cure.

SUMMARY

Various of the above needs, and others, are addressed by the following exemplary curable ink composition and methods.

Exemplary ink compositions and processes suitable for piezoelectric ink jet printing, in which a stable image that can be transferred to a substrate without cracking and hardened upon cure of ink compositions forming the image are provided. Some exemplary ink compositions meet requirements of transfuse printing processes while providing excellent print quality.

Exemplary curable ink compositions comprising one or more oil soluble components that are curable by radiation having wavelengths in the range of from about 4 nanometers to about 400 nanometers and one or more thermal solvents are separably provided.

Exemplary methods of preparing curable ink compositions that comprise dissolving one or more initiator in one or more oil soluble component, which is curable by radiation having wavelengths in the range of from about 4 nanometers to about 500 nanometers, to form a solution; optionally adding one or more colorant; agitating the solution, and adding one or more thermal solvent to the solution; heating the solution to melt and dissolve the thermal solvent; optionally homogenizing the heated solution to form a mixture; and optionally filtering the mixture are separably provided.

Exemplary methods of jet printing that comprise jetting an ink composition, which comprises one or more oil soluble component curable by radiation having wavelengths in the range of from about 4 nanometers to about 500 nanometers, and one or more thermal solvent, onto an intermediate substrate to form an intermediate image, transferring the intermediate image onto a substrate to form a transferred image, and exposing the transferred image to radiation having wavelengths in the range of from about 4 nanometers to about 500 nanometers are separably provided.

BRIEF DESCRIPTION OF THE DRAWINGS

A more complete understanding can be obtained by reference to the accompanying figures wherein.

DETAILED DESCRIPTION OF EMBODIMENTS

Figure 1:
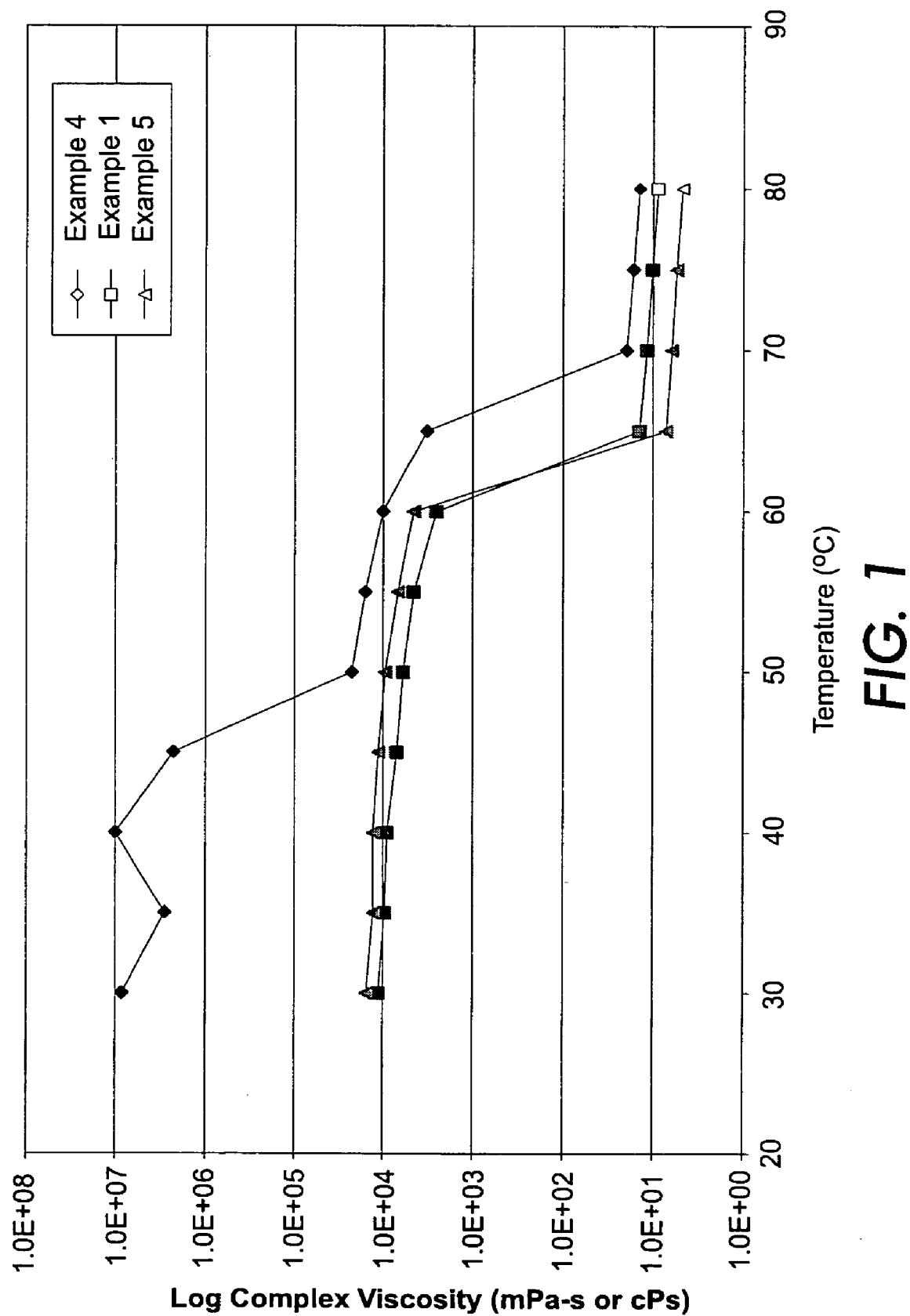
FIG. 1 is a graphical representation of the relationship between temperature and viscosity for certain exemplary curable ink composition.

Exemplary ink compositions provide superior print quality while meeting requirements of piezo ink jet printing processes.

In particular, exemplary ink compositions comprise one or more radiation curable oil soluble components and one or more thermal solvents. Exemplary methods of preparing such ink compositions and exemplary methods of using such ink compositions are also described.

Exemplary oil soluble components are curable by exposure to radiation having wavelengths in the range of from about 4 nanometers to about 500 nanometers, but is otherwise not particularly limited. However, selection of radical curable monomers should be governed by considerations such as safety, particularly with respect to the volatility of oil soluble components, as well as its skin irritancy, odor and other toxic concerns. Additional considerations include high cure rates and viscosity.

A variety of UV curable materials may be used as oil soluble components of exemplary ink compositions. For example, oil soluble components may include one or more of polyether acrylates, polyether methacrylates, epoxides, cyclicaliphatic epoxides, vinyl ethers, and mixtures thereof. Multifunctional vinyl ethers may also be used. Oil soluble components may be cationically radiation curable monomers, such as cycloaliphatic epoxides, polyfunctional cycloaliphatic epoxides, vinyl ether, and mixtures thereof.

Exemplary ink compositions may also include carrier compositions, such as heat-solvents or "thermal solvents." Suitable thermal solvents include, but are not limited to, waxy diols; paraffins; microcrystalline waxes; polyethylene waxes; ester waxes; fatty acids and other waxy materials; fatty amide containing materials; sulfonamide materials; isocyanate-derived resins and waxes, such as urethane isocyanate-derived materials, urea isocyanate-derived materials, urethane/urea isocyanate-derived materials, mixtures thereof, and the like; resinous materials made from different natural sources, for example, tall oil rosins and rosin esters; and mixtures thereof. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, and 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are incorporated herein by reference in their entirety.

Exemplary thermal solvents may be selected from difunctional fatty alcohols, including, but not limited to, those set forth in Table 1; polyols having a molecular weight of less than about 20,000 grams per mole; compounds such as urea, ethyl urea, methyl sulfonamide and ethylene carbonate; tetrahydro-thiophene-1,1-dioxide; methyl anisate; polycaprolactones having softening temperatures of from about 35° C. to about 50° C., polycaprolactone-block-polytetrahydrofuran-block-polycaprolactones having a melting point of about 30° C. to about 33° C., such as TERATHANE, from DuPont; pyridine N-oxide; acetamide; acrylamide; sulfamide; melimide; pyrazole; imidizole; and mixtures thereof. Thermal solvents may be used either individually or in combinations.

TABLE 1

|  | Molecular Formula | Molecular Weight | Melting Point, ° C. | Boiling Point, ° C. (pressure, kPa) |
|---|---|---|---|---|
| 1,6-Hexanediol | $C_6H_{14}O_2$ | 118.17 | 42 | 134 (1.3) |
| 1,7-Heptanediol | $C_7H_{16}O_2$ | 132.20 | 18 | 151 (1.9) |
| 1,8-Octanediol | $C_8H_{18}O_2$ | 146.23 | 61 | 167-168 (2.4) |
| 1,9-Nonanediol | $C_9H_{20}O_2$ | 160.26 | 45 | 173.2 (1.9) |
| 1,10-Decanediol | $C_{10}H_{22}O_2$ | 174.29 | 73 | 175-176 (1.9) |
| 1,11-Undecanediol | $C_{11}H_{24}O_2$ | 188.31 | 63 | 178 (1.6) |
| 1,12-Dodecanediol | $C_{12}H_{26}O_2$ | 202.34 | 81 | 183-184 (1.25) |
| 1,13-Tridecanediol | $C_{13}H_{28}O_2$ | 216.37 | 75-76 | 195-197 (1.3) |
| 1,14-Tetradecanediol | $C_{14}H_{30}O_2$ | 230.39 | 85 | 200 (1.2) |
| 1,15-Pentadecanediol | $C_{16}H_{32}O_2$ | 244.42 | 70.6-71.6 | 205-207 (1.3) |
| 1,16-Hexadecanediol | $C_{16}H_{34}O_2$ | 258.45 | 91.4 | 195-200 (0.53) |
| 1,17-Heptadecanediol | $C_{18}H_{36}O_2$ | 272.48 | 96-96.5 | 204-205 (0.27) |
| 1,18-Octadecanediol | $C_{19}H_{38}O_2$ | 286.50 | 97-98 | 210-211 (0.27) |
| 1,19-Nonadecanediol | $C_{20}H_{40}O_2$ | 300.53 | 101 | 212-214 (0.2) |
| 1,20-Eicosanediol | $C_{20}H_{42}O_2$ | 314.56 | 102.4-102.6 | 215-217 (0.2) |
| 1,21-Heneicosanediol | $C_{21}H_{44}O_2$ | 328.58 | 105-105.5 | 223-224 (0.2) |
| (Z)-9-Octadecene | $C_{18}H_{36}O_2$ | 284.49 | 89 | 182/0.06 |

Thermal solvents may be present in exemplary ink compositions in any desired or effective amount. Exemplary ink compositions may include thermal solvents in an amount of about 0 percent by weight to about 50 percent by weight, and in particular embodiments, in an amount of from about 0 percent by weight to about 30 percent by weight.

Exemplary ink compositions may be homogenized mixtures of oil soluble components and thermal solvents, as well as any optional additives.

Optional additives that may be used in embodiments include, but are not limited to initiating agents, colorants, dispersents and/or surfactants, conductivity enhancing agents, tackifiers, adhesives, plasticizers, nonpolymeric organic gelator additives, viscosity modifiers, clarifiers, defoamers, antifoamers, leveling agents, additives for roll release and lubricity, and the like, and mixtures thereof.

One or more initiating agent may be included in exemplary ink compositions for their known effects. Initiating agents that may be used include, but are not limited, to benzophenones; benzoin ethers; benzilketals; α-hydroxyalkylphenones; α-aminoalkylphenones; acylphosphine photoinitiators, such as those sold under the trade designations of IRGACURE and DAROCUR from Ciba; co-initiators and amine synergists, such as isopropylthioxanthone, ethyl 4-(dimethylamino)benzoate, 2-ethylhexyl dimethylaminobenzoate, and the like; and cationic photoinitiators, such as sulfonium, sulfoxonium, and iodonium salts.

Initiating agents, such as photoinitiators, should be thermally stable at the operating temperatures employed. For example, the operating temperature of a piezoelectric printing head is generally in the range of from about 70° C. to about 80° C., and initiating agents included in ink compositions printed on such a head should be thermally stable at such temperatures. Thus, in exemplary compositions so-called Norrish type I initiating systems, for example 2-benzyl-2-(dimethylamino)-1-(4-(4-morphorlinyl)phenyl)-1-butanone, 2-methyl-1-(4-methylthio)phenyl-2-(4-morphorlinyl)-1-propanone, diphenyl-(2,4,6-trimethylbenzoyl) phospine oxide, phenyl bis(2,4,6-trimethylbenzoyl) phosphine oxide, 1-hydroxy-cyclohexylphenylketone, benzyl-dimethylketal, 2,4,6-trimethylbenzoylphenylphosphinic acid ethyl ester, oligo(2-hydroxy-2-methy-1-(4-(1-methylvinyl)phenyl) propanone), 2-hydroxy-2-methyl-1-phenyl-1-propanone, 1-(4-(2-hydroxyethoxy)phenyl)-2-hydroxy-2-methylpropan-1-one may be preferred. Norrish type II initiating systems, such as isopropylthioxanthone, benzophenone, 2,4,6-trimethylbenzophenone, 4-methylbenzophenone, camphorquinone and optionally amine synergists may also be used such as ethyl-4-dimethylaminobenzoate and 2-ethylhexyl-4-dimethylamino benzoate may also be used. In cationic polymerization the following sulphonium initiators, such as, bis[4-(diphenylsulphonio)-phenyl] sulphide bis-hexafluorophosphate, bis[4-di(4-(2-hydroxyethyl)phenyl) sulphonio-phenyl] sulphide bis-hexafluorophosphate, bis[4-di(4-(2-hydroxyethyl)phenyl)sulphonio-phenyl] sulphide bis-hexafluoroantimonate, CYRACURE UVI-6990 from Dow Chemical, R-GEN® BF-172 from Chitec Chemical Co. maybe used. Iodonium cationic intiators, 4-methylphenyl-(4-(2-methylpropyl) phenyl)iodonium hexafluorophosphate, may also be used; however, these systems have proven to be less thermally stable possibly as a result of their lower oxidation potential.

Exemplary ink compositions may also contain one or more colorants. Any desired or effective UV stable colorant, including dyes, pigments, mixtures thereof, and the like, that can be dissolved or dispersed in the thermal solvent, may be used as the optional colorant. Colorants may be present in ink compositions in any desired or effective amount to obtain the desired color and hue. Optional colorants may be present in an amount in a range of from about 0.5 percent by weight to about 15 percent by weight of the ink composition; in particular embodiments, in a range of from about 1 percent by weight to about 10 percent by weight of the ink composition; and further, in a range of from about 2.5 percent by weight to about 5 percent by weight of the ink composition.

Examples of suitable pigments include, but are not limited to, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); HOSTAPERM Blue B2G-D (Clariant); Permanent Red P-F7RK; HOSTAPERM Violet BL (Clariant); LITHOL Scarlet 4440 (BASF); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); SUNBRITE Yellow 17 (Sun Chemical 275-0023); HELIOGEN Blue L6900, L7020 (BASF); SUNBRITE Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2G01 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); HANSA Brilliant Yellow 5GX03 (Clariant); Permanent Yellow GRL 2 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); and carbon blacks such as REGAL 330.®. (Cabot), Carbon Black 5250, Carbon Black 5750 (Columbia Chemical), mixtures thereof and the like.

Exemplary ink compositions may include one or more dispersants and/or one or more surfactants for their known properties, such as controlling wetting properties of the ink composition, and stabilizing colorants. Examples of suitable additives that may be used in embodiments include, but are not limited to, BYK-UV 3500, BYK-UV 3510 (BYK-Chemie); Dow Corning 18, 27, 57, 67 Additives; ZONYL FSO 100 (DuPont); MODAFLOW 2100 (Solutia); Foam Blast 20F, 30, 550 (Lubrizol); EFKA-1101, -4046, -4047, -2025, -2035, -2040, -2021, -3600, -3232; SOLSPERSE 19200, 20000, 34750, 36000, 39000, 41000, 54000, individual dispersants or combinations may optionally be used with synergists including SOLSPERSE 5000, 12000, 22000 (Lubrizol); DISPERBYK-108, -163, -167, 182 (BYK-Chemie); K-SPERSE 132, XD-A503, XD-A505 (King Industries).

Exemplary ink compositions may also optionally contain one or more antioxidants, for the known properties of antioxidants, such as protecting the images from oxidation and protecting components of ink compositions from oxidation during the heating portion of ink preparation and usage processes. Suitable antioxidants that may be used include, but are not limited to, 2,6-di-tert-butyl-4-methoxyphenol, 2,4-di-tert-butyl-6-(4-methoxybenzyl) phenol, 4-bromo-2,6-dimethylphenol, 4-bromo-3,5-didimethylphenol, 4-bromo-2-nitrophenol, 4-(diethyl aminomethyl)-2,5-dimethylphenol, 3-dimethylaminophenol, 2-amino-4-tert-amylphenol, 2,6-bis(hydroxymethyl)-p-cresol, 2,2'-methylenediphenol, 5-diethylamino)-2-nitrosophenol, antimony dialkyl phosphorodithioate, molybdenum oxysulfide dithiocarbamate, (nickel-bis(o-ethyl(3,5-di-tert-butyl-4-hydroxybenzyl) phosphonate, 4,4'-methylene-bis(dibutyldithiocarbamate), tetrasodium-N-(1,2-dicarboxyethyl)-N-octadecyl sulfosuccinamate, IRGASTAB UV 10 (Ciba), 2,6-di-tert-butyl-.alpha.-dimethylamino-4-cresol, 2,2'-isobutylidene-bis(4,6-dimethyl phenol), 2,2'-methylenebis (6-tert-butyl-4-methylphenol), 2,2'-methylenebis(6-tert-butyl-4-ethylphenol), N-isopropyl-N'-phenyl-ph-enylene diamine, N-(1,3-dimethylbutyl)-N'-phenyl-phenylene-diamine, N,N'-di(2-octyl)-4-phenylene diamine, N,N'-bis(1,4-dimethylpentyl)-4-phenylen-e diamine, 2,4,6-tris-(N-1,4-dimethyl pentyl-4-phenylenediamino)-1,-3,5-triazine, D-raffinose pentahydrate, 2,2'-methylene bis(6-tert-butyl-4-methyl-phenol), 2,6-di-tert-butyl-4-(dimethylaminomethyl) phenol, 4-dodecylresorcinoland the like, as well as mixtures thereof. When present, optional antioxidants may be present in any desired or effective amount. Optional antioxidants may be present in an amount in a range of from about 0.001 percent by weight to about 0.5 percent by weight of the ink composition; and in a range of from about 0.01 percent by weight to about 0.25 percent by weight of the ink composition.

Exemplary ink compositions are generally solid at temperatures of about 50° C. and lower, and particular embodiments are solid at temperatures of about 60° C. and lower.

Herein, the term "melting point" with respect to exemplary ink compositions means a temperature or temperature range at which ink compositions transition from solid state to gel state Exemplary ink compositions may be in the solid state at temperatures below their melting point. Exemplary ink compositions have melting points in a range of from about 60° C. to about 160° C.; in a range of from about 70° C. to about 140° C.; and in a range of from about 70° C. to about 110° C. Exemplary ink compositions may be solid at temperatures of about 50° C. and lower, and/or may be solid at temperatures of about 60° C. and lower.

In addition, uncured ink compositions of embodiments may have a viscosity in a range of from about $10^{3.5}$ centipoise to about $10^9$ centipoise at a temperature of about 60° C. or less. Exemplary ink compositions may have a viscosity in a range of from about 5 centipoise to about 15 centipoise at a temperature of about 70° C. or more.

While not being limited to any particular theory, it is believed that exemplary ink compositions exhibit rheological and mechanical properties that are advantageous and enabling in printing processes using a transfuse subsystem and in printing processes using a fusing and/or post-fusing process. It is believed that exemplary ink compositions are tough solids at room temperature or near room temperature, thereby enabling excellent image robustness. It is believed that exemplary ink compositions are liquid at piezo jetting temperatures. It is believed that exemplary ink compositions form stable images when jetted onto a substrate at a temperature lower than a jetting temperature. It is believed that exemplary ink compositions are transferable without cracking onto further substrates. It is believed that ink compositions become tough solids when cooled to room temperature. It is believed that ink exemplary compositions are irreversibly solidified upon curing with radiation having wavelengths in the range of from about 4 nanometers to about 400 nanometers.

Exemplary ink compositions can be prepared by any desired or suitable method. However, processes for preparing ink compositions may include dissolving one or more optional initiating agents in one or more oil soluble component, which is curable by radiation having wavelengths in the range of from about 4 nanometers to about 500 nanometers; optionally adding one or more additives, such as colorants; gently agitating the solution; adding one or more thermal solvent; heating to melt and dissolve the thermal solvent; optionally homogenizing the melted mixture; optionally filtering the mixture; and cooling the mixture to yield a solid ink composition.

Exemplary processes may comprise incorporating an exemplary ink composition into an ink jet printing apparatus, jetting the ink composition onto an intermediate substrate to form an intermediate image, optionally exposing the intermediate image to radiation having wavelengths in the range of from about 4 nanometers to about 500 nanometers; transferring the intermediate image onto a substrate to form a transferred image, and exposing the transferred image to radiation having wavelengths in the range of from about 4 nanometers to about 500 nanometers; wherein the ink composition comprises one or more oil soluble component curable by radiation having wavelengths in the range of from about 4 nanometers to about 400 nanometers, and one or more thermal solvent. Printing apparatuses may employ a piezoelectric printing process wherein droplets of the ink are caused to be ejected in imagewise pattern by oscillations of piezoelectric vibrating elements. Printing apparatuses may also employ an acoustic ink jet process, wherein droplets of the ink are caused to be ejected in imagewise pattern by acoustic beams.

Droplets of melted ink may be caused to be ejected onto an intermediate transfer member, followed by transfer of the image from the intermediate transfer member to a recording sheet. An intermediate transfer member may be heated to a temperature above that of a final recording sheet and below that of a melted ink in a printing apparatus. Exemplary ink compositions may also be employed in other hot melt printing processes, such as hot melt thermal ink jet printing, hot melt continuous stream or deflection ink jet printing, or the like.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, and the like, transparency materials, fabrics, textile products, plastics, polymeric films, inorganic substrates such as metals and wood, and the like. Exemplary processes entail printing onto a porous or ink absorbent substrate, such as plain paper.

U.S. Pat. No. 4,538,156, the disclosure of which is incorporated herein by reference in its entirety, discloses an ink jet printer utilizing a smooth surfaced transfer drum that may be used in accordance with embodiments.

Specific exemplary ink compositions will now be described in detail. These examples are intended to be illustrative, not limiting. All parts and percentages are by weight unless otherwise indicated.

EXAMPLES

The following examples are prepared by dissolving the initiating agents in the oil soluble components with stirring. After complete dissolution, stirring is continued while the optional colorant is added to the. Finally, the temperature of the mixture is raised to about 110° C. above the melting point of the thermal solvent, and the thermal solvent is added with continuous stirring.

Example 1

The individual components of the ink composition of Example 1 are as set forth in TABLE 2.

TABLE 2

| Example 1 | | Amount % by weight |
|---|---|---|
| Oil soluble component | Alkoxylated tetrahydrofurfuryl acrylate (SARTOMER CD611) | 15 |
| | Trifunctional polyether acrylate (LAROMER PO 43 F, BASF) | 12 |
| | Alkoxylated aliphatic diacrylate (SARTOMER SR9209) | 25 |
| Thermal solvent | 1,10 decanediol, Mp = 72° C. | 30 |
| Colorant | 249-3054 polymeric dispersant modified Pigment Blue 15:4 (Sun Chemicals) | 6 |
| Initiating agent | IRGACURE 369 (Ciba) | 1.0 |
| | IRGACURE 907 (Ciba) | 2.0 |

Example 2

The individual components of the ink composition of Example 2 are as set forth in TABLE 3.

TABLE 3

| Example 2 | | Amount % by weight |
|---|---|---|
| Oil soluble component | Alkoxylated tetrahydrofurfuryl acrylate (SARTOMER CD611) | 30.4 |
| | Trifunctional polyether acrylate (LAROMER PO 43 F, BASF) | 7.6 |
| | Alkoxylated aliphatic diacrylate (SARTOMER SR9209) | 26.1 |
| Thermal solvent | 1,10 decanediol, Mp = 72° C. | 32.6 |
| Initiating agent | IRGACURE 369 (Ciba) | 1.1 |
| | IRGACURE 907 (Ciba) | 2.2 |

Example 3

The individual components of the ink composition of Example 3 are as set forth in TABLE 4.

TABLE 4

| Example 3 | | Amount % by weight |
|---|---|---|
| Oil soluble component | Isodecyl acrylate (SARTOMER SR395) | 34 |
| | Pentaerythritol tetraacrylate (SARTOMER SR 494) | 3 |
| | Dipropoxylated neopentyl glycol diacrylate (SARTOMER SR9003) | 23.5 |
| Thermal solvent | 1,12-dodecanediol, Mp = 81-84° C. | 30 |
| Colorant | Solvent Blue 37, Keystone Aniline Corp. | 2 |
| Initiating agent | IRGACURE 369 (Ciba) | 1.0 |
| | IRGACURE 907 (Ciba) | 2.0 |

Example 4

The individual components of the ink composition of Example 4 are as set forth in TABLE 5.

TABLE 5

| Example 4 | | Amount % by weight |
|---|---|---|
| Oil soluble component | Bis-(3,4-epoxycyclohexylmethyl) adipate (DOW UVR-6128) | 29.8 |
| | Epoxidized propylene glycol dioleate (ATOFINA VIKOFLEX 5075) | 35.6 |
| Thermal solvent | 1,10-decanediol, Mp = 72° C. | 31.9 |
| Initiating agent | Arylsulfonium hexafluorophosphate salt (Dow UVI-6992) | 2.7 |

The ink composition of Example 4 includes oil soluble components that are cationically curable. When the ink composition is exposed to radiation in the wavelength 200-320 nm, the oil soluble components are cured, and the diols of the thermal solvent may also react.

Example 5

The individual components of the ink composition of Example 5 are as set forth in TABLE 6.

TABLE 6

| Example 5 | | Amount % by weight |
|---|---|---|
| Oil soluble component | Bis-(3,4-epoxycyclohexylmethyl-3,4-epoxycyclohexane carboxylate) (DOW UVR-6110) | 36.8 |
| | Triethyleneglycol divinyl ether (DVE-3 BASF) | 19.5 |
| | 1-(ethenyloxy)-dodecyl alcohol (DDVE, ISP) | 8.6 |
| Thermal solvent | 1,10 decanediol, Mp = 72° C. | 32.4 |
| Initiating agent | Arylsulfonium hexafluorophosphate salt (Dow UVI-6992) | 2.7 |

The above Examples are subjected to viscosity tests at temperatures of from 50° C. to 80° C. The viscosities of Examples 1, 2, 4 and 5 at temperatures within this range are shown in TABLE 7. The viscosity data for Examples 1, 4 and 5 is shown in FIG. 1, which clearly demonstrates a sharp increase in viscosity for these exemplary embodiments in the temperature range of 60 to 70° C.

TABLE 7

| | $\eta^*$ | | | | |
|---|---|---|---|---|---|
| Example | @ 80° C. (centipoise) | @ 75° C. (centipoise) | @ 70° C. (centipoise) | @ 60° C. (centipoise) | @ 50° C. (centipoise) |
| 1 | 8.9 | 10.2 | 11.7 | 2570 | 5951 |
| 2 | 5.4 | 6.1 | 7.0 | 1527 | 3826 |
| 4 | 14.2 | 16.5 | 19.6 | 10080 | 15862 |
| 5 | 4.7 | 5.44 | 6.19 | 4609 | 6850 |

The ink composition of Example 1 is observed to display Newtonian behavior, and is further subjected to print testing using a modified XEROX PHASER 850 ink jet printer, in which the temperature set points have been reduced. The ink composition of Example 1 is jetted at 75° C. and transfused sharp images to paper. Transfuse of the ink composition is demonstrated between 200 to 500 psi transfuse roll pressure. A standard PHASER 860 drum, with standard oiling rates of 3-6 mg/page and standard transfuse rates of 20 inches/second, is used for the print testing of the ink composition of Example 1. The drum temperature is controlled at 32° C. throughout testing. Extremely robust images are obtained upon curing the jetted ink composition of Example 1 using a UV Fusion D bulb. A sample of the ink composition of Example 1 is cured on a glass slide under illumination from 415 nm LED array from UV Process Supplies.

Figure 2:
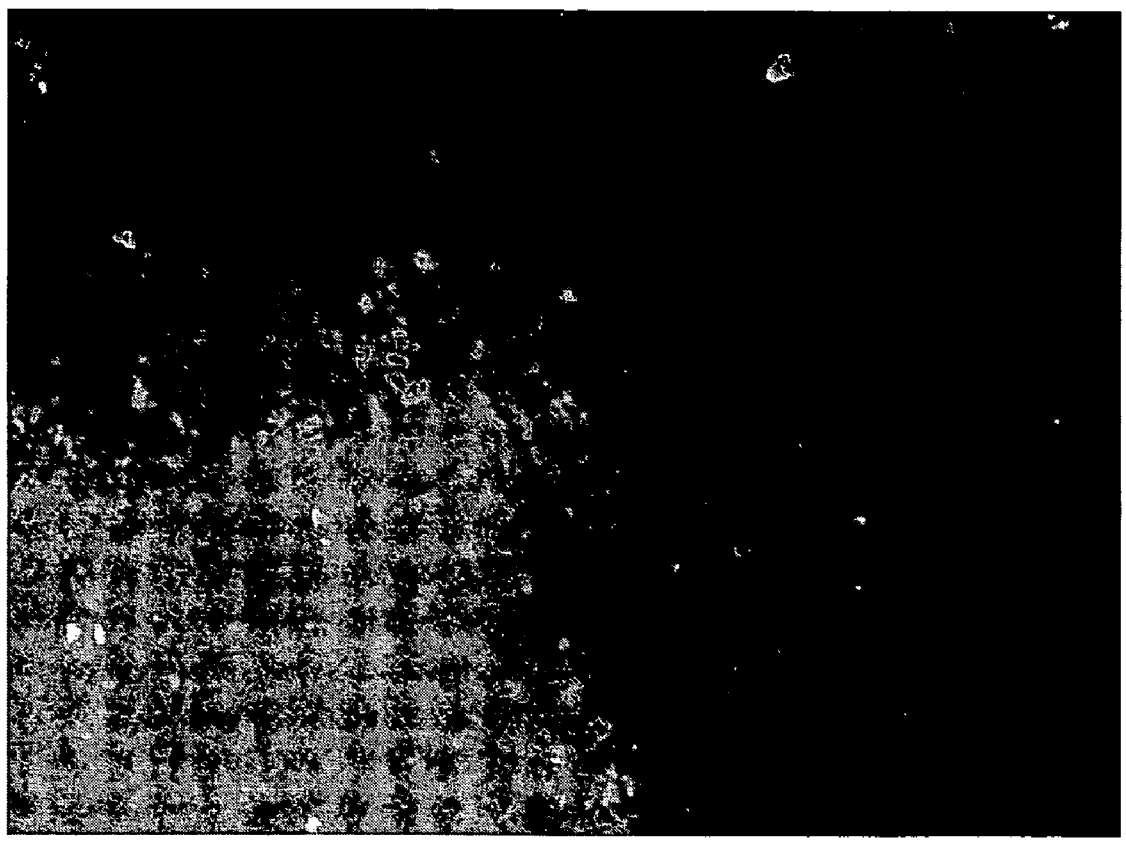
FIGS. 2-5 are micrographic images showing the results of print tests of a conventional phase change ink composition and an exemplary phase change ink composition.
Figure 3:
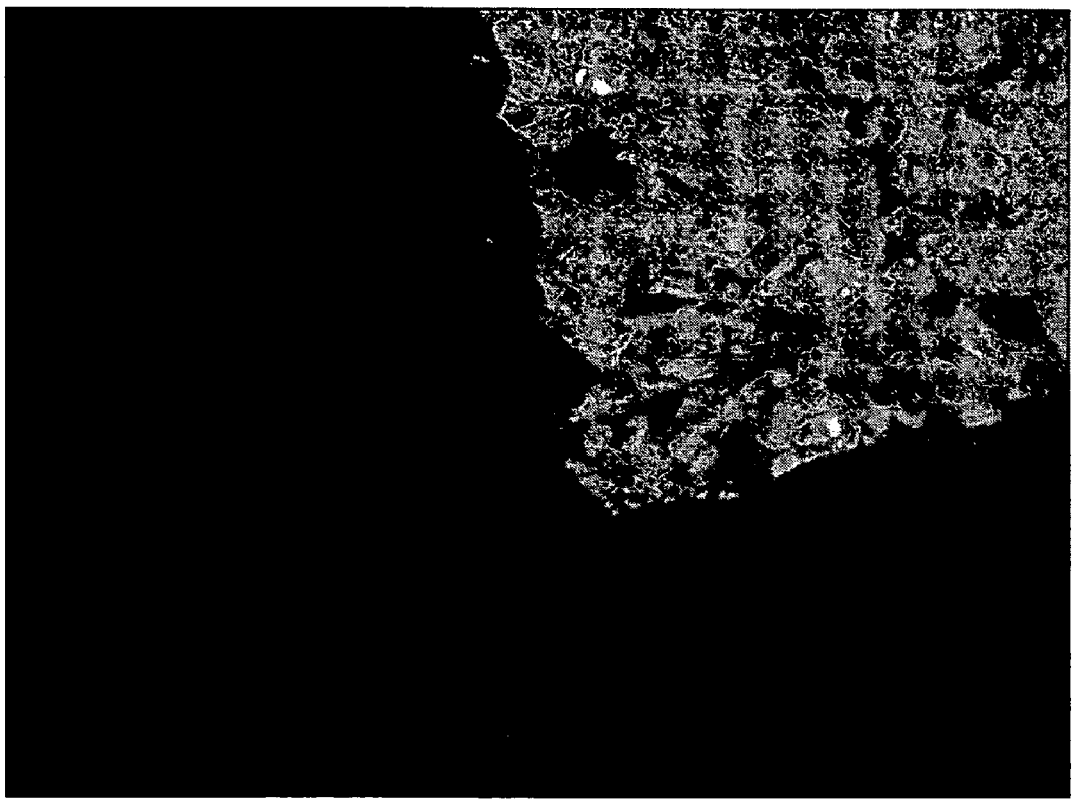
Figure 4:
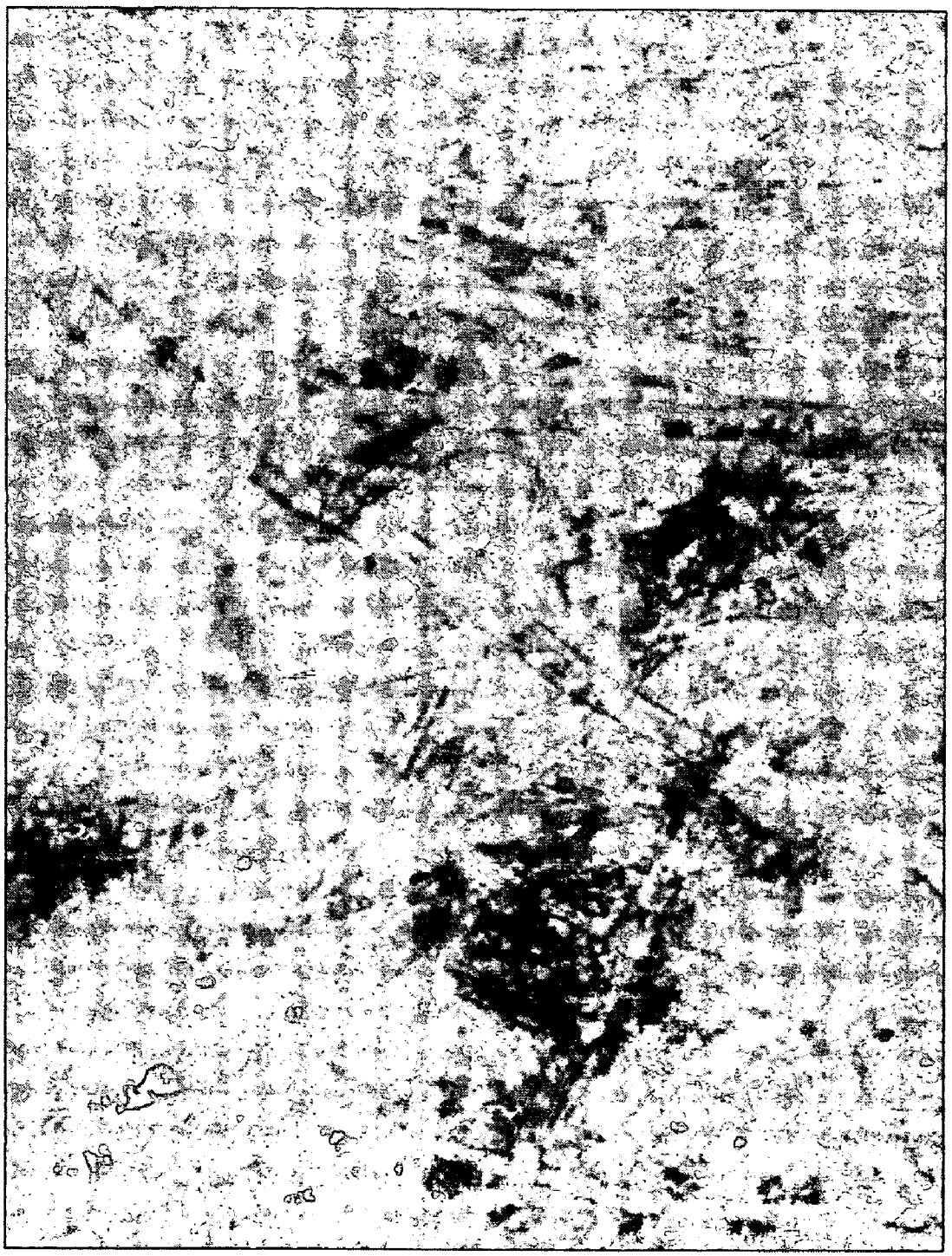
Figure 5:
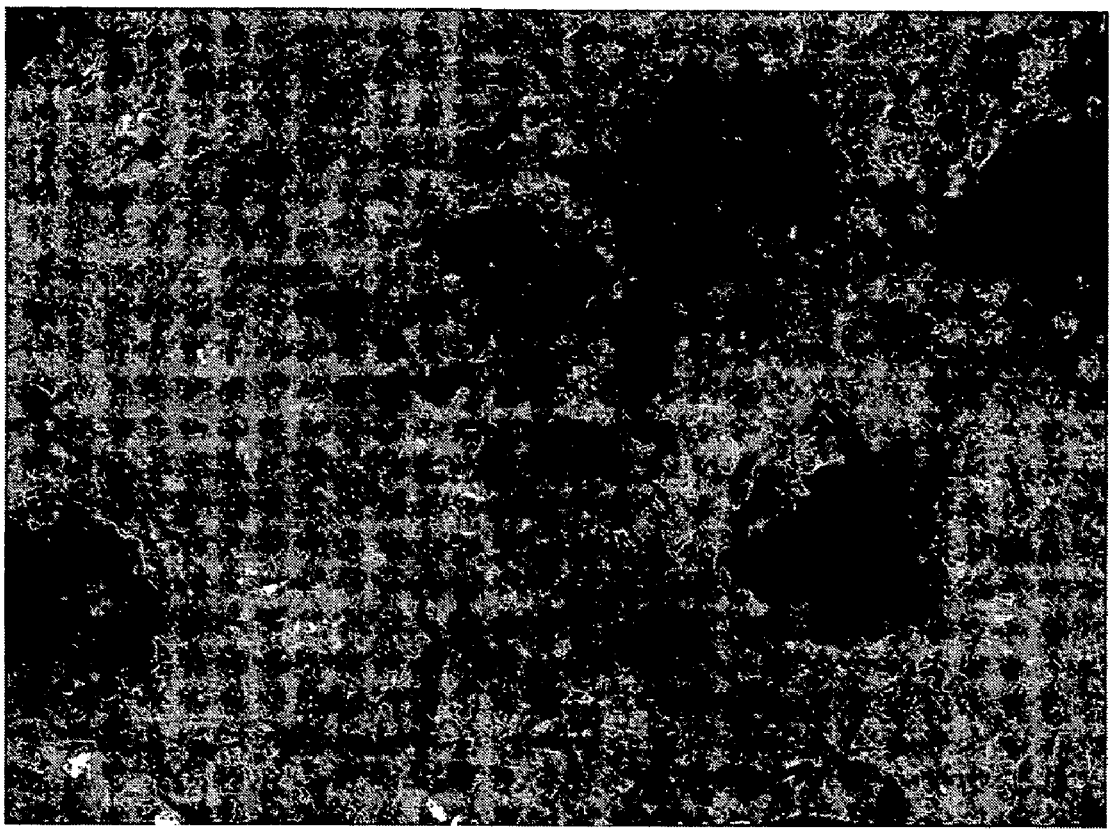

FIGS. 2 and 4 are micrographs of images on paper formed by the ink composition of the Example 1, and FIGS. 3 and 5 are photomicrographs of images on paper formed by a standard phase change ink composition. Comparison of FIGS. 2 and 3, the micrographs of line edges of images formed by the ink compositions of Example 1 and the standard phase change ink composition, respectively, and comparison of FIGS. 4 and 5, the micrographs of dot images formed by the ink compositions of Examples 1 and the standard phase change ink composition, respectively, indicates that the image on paper of the ink compositions of this invention are similar to standard phase change ink compositions. In addition, images formed by the ink composition of Example 1 displays a pile height of 1-2 microns, which is much lower than the pile height of about 10 microns of images formed by standard phase change ink compositions, as measured by a L&W Micrometer 51.

While exemplary embodiments have been described above, various alternatives, modifications, improvements, and/or substantial equivalents, whether known or that are, or may be, presently unforeseen, may become apparent to those having at least ordinary skill in the art. Accordingly, the exemplary embodiments as set forth above are intended to be illustrative, not limiting.

What is claimed is:

1. A curable ink composition comprising:
   one or more oil soluble component, and
   one or more thermal solvent,
   wherein the oil soluble component is curable by radiation having wavelengths in the range of from about 4 nanometers to about 500 nanometers and the curable ink composition has a viscosity in a range of from about $10^{3.5}$ centipoise to about $10^9$ centipoise at a temperature of about 60° C. or less.

2. The curable ink composition according to claim 1, wherein the curable ink composition is a homogeneous mixture of the oil soluble component and the thermal solvent.

3. The curable ink composition according to claim 1, wherein the oil soluble component is one or more monomer.

4. The curable ink composition according to claim 3, wherein the monomer is cationically curable.

5. The curable ink composition according to claim 3, wherein the monomer is radically curable.

6. The curable ink composition according to claim 3, wherein the monomer is one or more member chosen from the group consisting of acrylates, methacrylates, epoxides, cyclicaliphatic epoxides, vinyl ethers, and mixtures thereof.

7. The curable ink composition according to claim 1, wherein the thermal solvent is a waxy diol.

8. The curable ink composition according to claim 1, wherein the thermal solvent is one or more member chosen from the group consisting of difunctional fatty alcohols, polyols having a molecular weight of less than about 20,000 grams per mole, polycaprolactones having softening temperatures of from about 35° C. to about 50° C., polycaprolactone-block-polytetrahydrofuran-block-polycaprolactones having a melting point of about 30° C. to about 33° C., pyridine N-oxide, acetamide, acrylamide, sulfamide, melimide, pyrazole, imidizole, and mixtures thereof.

9. The curable ink composition according to claim 1, wherein the thermal solvent has a melting point in a range from about 35° C. to about 100° C.

10. The curable ink composition according to claim 1, wherein the thermal solvent is present in an amount from 0 to about 50 percent by weight.

11. The curable ink composition according to claim 1, wherein the thermal solvent is present in an amount from 0 to about 30 percent by weight.

12. The curable ink composition according to claim 1, wherein the curable ink composition has a viscosity in a range of from about 5 centipoise to about 15 centipoise at a temperature of about 70° C. or more.

13. The curable ink composition according to claim 1, further comprising one or more additive.

14. The curable ink composition according to claim 1, wherein the additive is one or more member chosen from the group consisting of initiating agents, colorants, dispersants and/or surfactants, and mixtures thereof.

15. The curable ink composition according to claim 14, wherein the additive is one or more initiating agent chosen from the group consisting of benzophenones, benzoin ethers, benzilketals, α-hydroxyalkylphenones, α-aminoalkylphenones, acylphosphine photoinitiators, co-initiators, amine synergists, sulfonium salts, sulfoxonium salts, iodonium salts, and mixtures thereof.

16. The curable ink composition according to claim 14, wherein the additive is one or more colorant chosen the group consisting of from UV stable pigments, UV stable dyes, and mixtures thereof.

17. A method of preparing a curable ink composition, comprising
   dissolving one or more initiator in one or more oil soluble component to form a solution;
   agitating the solution;
   adding one or more thermal solvent to the solution; and
   heating the solution including the one or more thermal solvent to melt and dissolve the thermal solvent;
   wherein the oil soluble component is curable by radiation having wavelengths in the range of from about 4 nanometers to about 500 nanometers and the curable ink composition has a viscosity in a range of from about $10^{3.5}$ centipoise to about $10^9$ centipoise at a temperature of about 60° C. or less.

* * * * *